United States Patent [19]

Haney

[11] Patent Number: 4,522,439
[45] Date of Patent: Jun. 11, 1985

[54] AUTOMATIC PIPE ELEVATOR

[75] Inventor: Keith M. Haney, Wichita Falls, Tex.

[73] Assignee: Walker-Neer Manufacturing Co., Inc., Wichita Falls, Tex.

[21] Appl. No.: 522,490

[22] Filed: Aug. 12, 1983

[51] Int. Cl.³ .............................................. B25J 15/00
[52] U.S. Cl. .................................... 294/110.1; 294/116
[58] Field of Search ................... 294/110 R, 116, 101, 294/102 A, 115, 90, 118, 100, 104; 24/242, 232, 251, 243, 248; 74/99 R

[56] References Cited

U.S. PATENT DOCUMENTS

| 3,249,334 | 5/1966 | Sheperd et al. | 294/104 |
| 4,017,112 | 4/1977 | Delest | 294/110 R |
| 4,314,611 | 2/1982 | Willis | 173/57 |

Primary Examiner—James B. Marbert
Attorney, Agent, or Firm—Willian Brinks Olds Hofer Gilson & Lione

[57] ABSTRACT

A self-locking and unlocking elevator for use with drill pipe is disclosed which, in a specific embodiment, includes a pair of jaws, each shaped to support a length of pipe; and central and upper linkage assemblies, for opening and closing the jaws about a section of drill pipe. The invention also includes a ratchet mechanism for locking the jaws open to receive or release a length of pipe, or to allow changing the clamping surfaces to accommodate different sizes of pipe; and for unlocking the jaws to allow closure over and clamping of a length of pipe.

24 Claims, 14 Drawing Figures

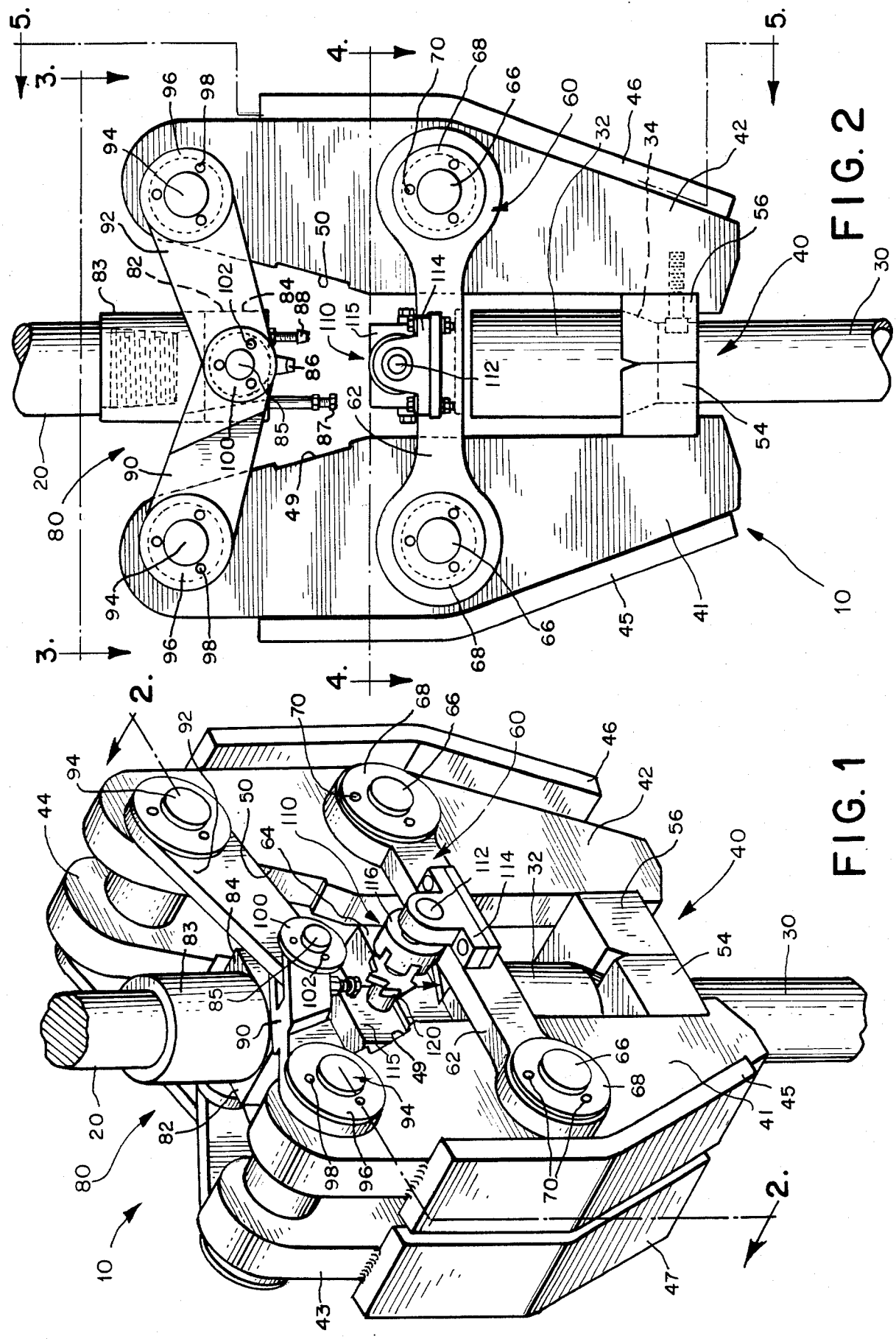

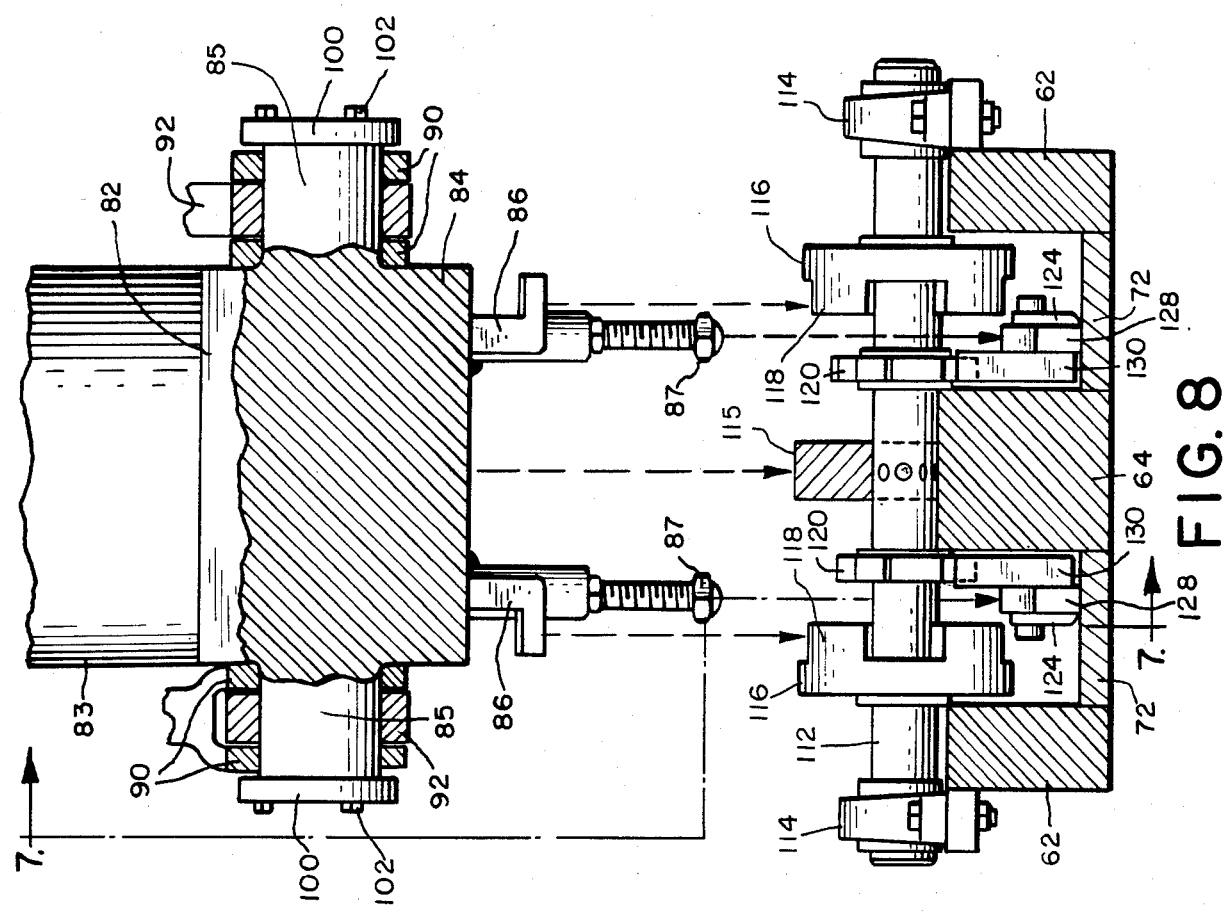
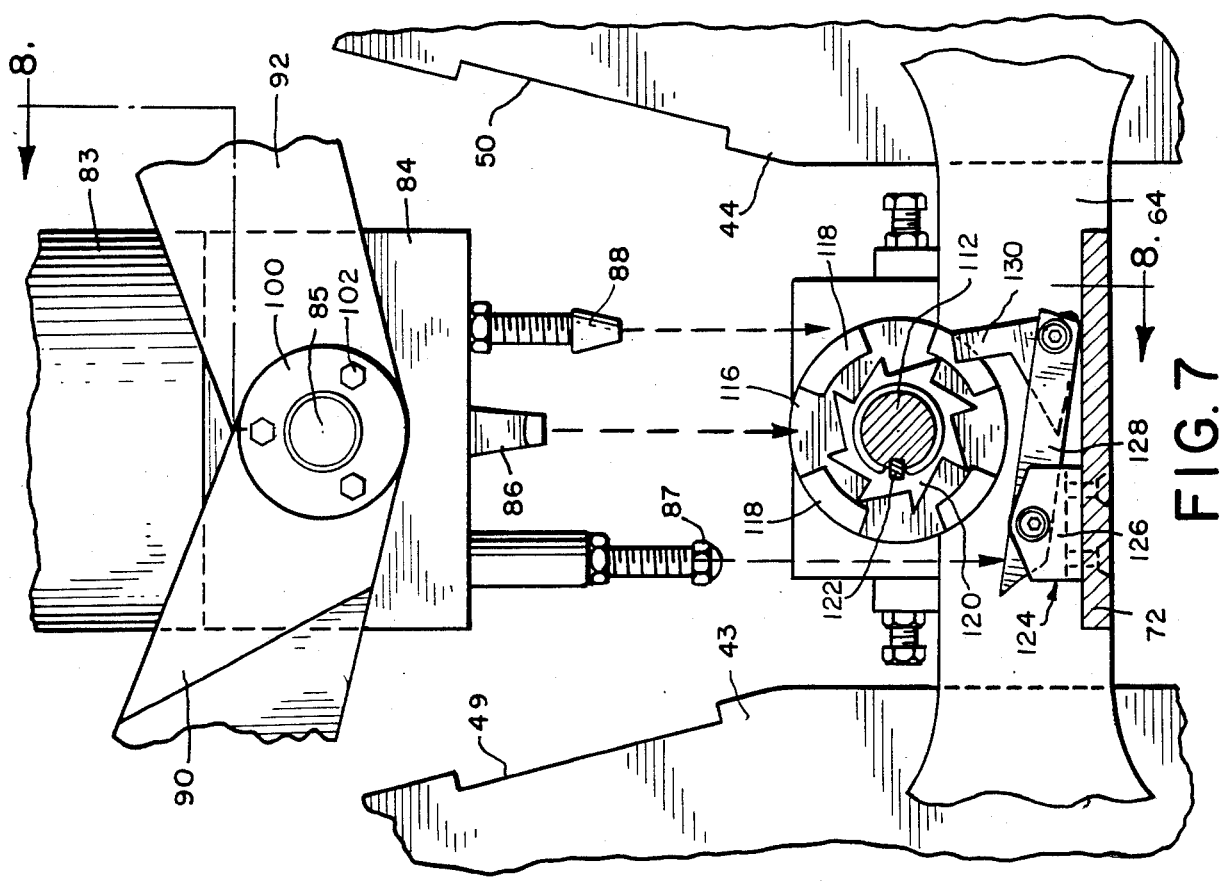

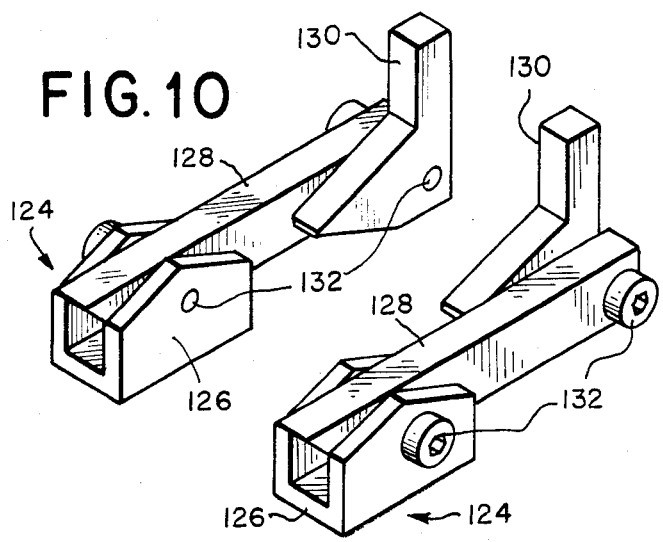
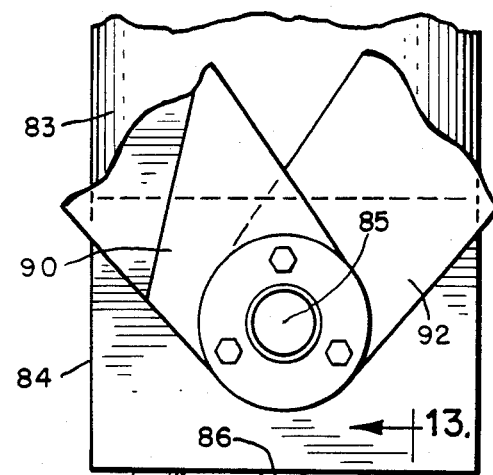
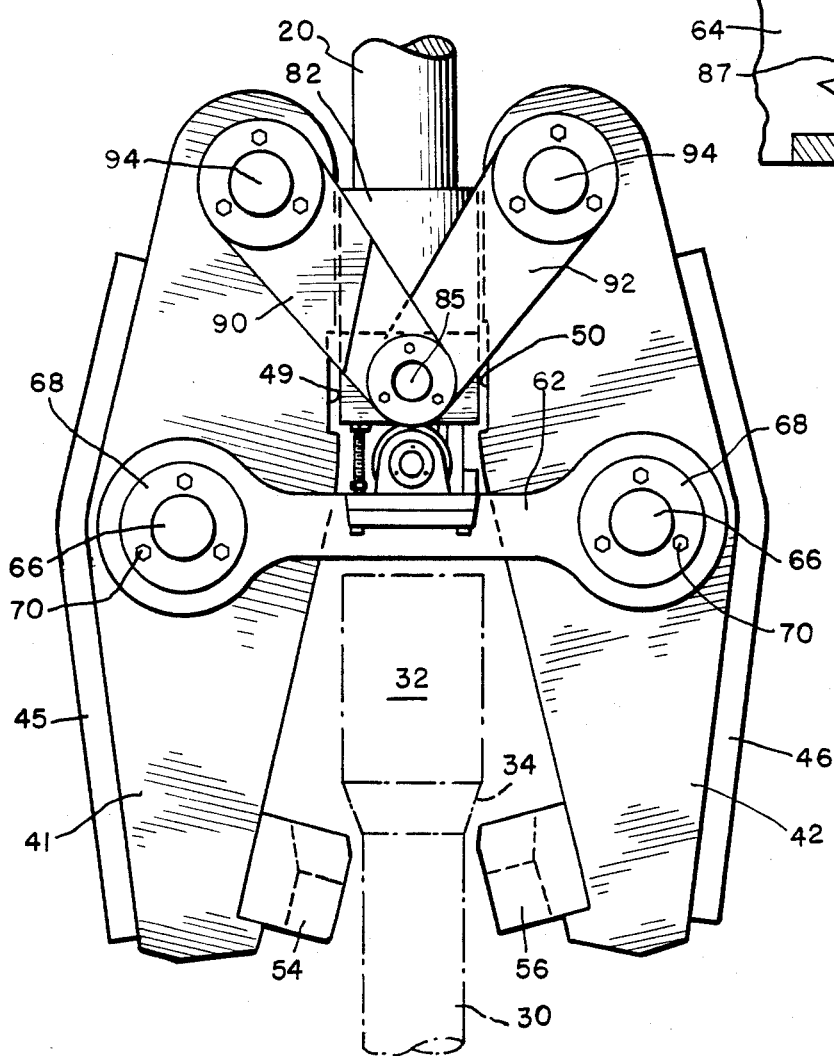
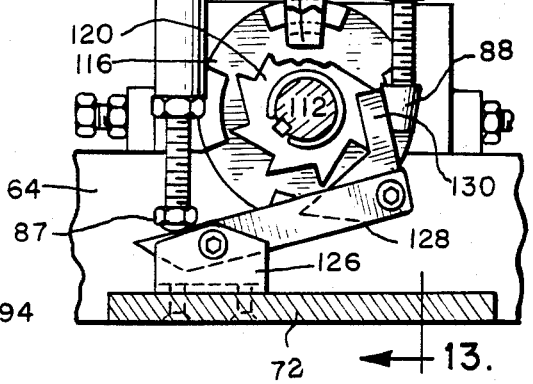

AUTOMATIC PIPE ELEVATOR

CROSS-REFERENCE TO RELATED APPLICATION

Co-pending, commonly assigned U.S. patent application Ser. No. 430,943, filed Sept. 30, 1982, by C. A. Willis, the disclosure of which is incorporated by reference, describes and claims a pipe elevator of which the present invention is an improvement.

BACKGROUND OF THE INVENTION

This invention relates to an improved elevator assembly adapted for use with a well drilling apparatus in order to lift or lower drilling tubulars quickly and efficiently.

In a wide variety of well drilling operations, it is necessary to assemble a drill string from a large number of individual lengths of drill pipe as a borehole is being drilled. When it becomes necessary for any reason to remove the drill string from borehole, as for example to replace worn drill bit, the drill string must be progressively raised as successive lengths of drill pipe are brought to the surface and removed from the drill string. Well servicing requires similar equipment, which, in smaller sizing, is used to pull or replace sucker rods, production piping, etc., for pump service, replacement of worn pipes or rods, or during well cleanout to improve production.

One type of drilling apparatus in wide-spread use utilizes a power swivel which is threadedly coupled to the uppermost length of drill pipe and then used to raise the drill string and to remove the uppermost length of drill pipe from the string. Once this has been accomplished, the threaded connection between the power swivel and the uppermost length of drill pipe is broken, and means such as a transfer arm can then be used to move the length of drill pipe from the vertical position aligned with the borehole to a horizontal position at ground level.

This prior art approach to raising a drill string and successively removing lengths of drill pipe from the string is not entirely acceptable. It requires that the power swivel be threadedly coupled to each successive length of drill pipe, and that this threaded connection then be broken. These repeated threading and unthreading operations can significantly slow the rate at which drill pipe can be removed from a borehole. In addition, these threading and unthreading operations can cause undesirable wear on the threaded connections of the swivel and of the drill pipe.

It is therefore an object of this invention to provide an improved apparatus useful in removing drill pipe from a borehole, and in particular to provide such an apparatus which does not require threaded connections between the apparatus and the drill pipe, and which can be used to speed the rate at which drill pipe can be removed from a borehole.

An additional object of this invention is to provide an improved apparatus as compared to the invention of U.S. patent application Ser. No. 430,943, using linkages to control the movement of the jaws, rather than a collar.

A further object of the present invention is to provide a mechanism for locking the jaws open to receive or release a length of pipe, or to allow changing jaw inserts to accommodate different sizes of pipe, and for unlocking the jaws to allow closure over and clamping of a length of pipe.

SUMMARY OF THE INVENTION

According to this invention, there is provided an elevator for drill pipe, comprising:

(a) at least two jaws, each jaw having a clamping surface shaped to support a length of pipe;

(b) a central linkage assembly, serving as a pivot means for urging the clamping surfaces of the jaws into contact with a length of pipe to be elevated, when the end of the jaws distant from the clamping surfaces are urged away from the pipe; and (c) an upper linkage assembly, serving as an elevator suspension and jaw activating means for suspending the elevator, for urging the ends of the jaws distant from the clamping surfaces away from the pipe, and in conjunction with the pivot means, for urging the clamping surfaces into contact with the pipe, when the elevator suspension and jaw activating means and a pipe are urged away from each other; and as a release means for urging the clamping surfaces away from the pipe when the elevator suspension and jaw activating means and the pipe are urged toward each other.

More specifically, there is provided according to the present invention an elevator for drill pipe, comprising:

(a) a pair of opposed jaws for clamping a section of drill pipe, each jaw having at its lower end, a clamping surface shaped to support a length of pipe;

(b) central linkage means for holding the jaws apart while pivoting about axes at the ends of the central linkage means; and (c) upper linkage and suspension means, for supporting the elevator, for urging the upper portion of the jaws outward to grasp a section of drill pipe with the clamping surfaces, and for urging the upper portion of the jaws inward to release the section of drill pipe.

Still more specifically, the present invention provides an elevator for drill pipe, comprising:

(a) a pair of opposed jaws for clamping a section of drill pipe, each jaw having a clamping surface shaped to support one side of a length of drill pipe and a drill pipe shoulder at the end of the drill pipe;

(b) a rigid central linkage joining a central portion of each jaw to a central portion of the opposing jaw, maintaining the central portion of each jaw a fixed distance apart, and allowing pivotal movement of each jaw about an axis perpendicular to the jaw; and (c) a jointed upper linkage assembly, comprising:
(i) central connector means, and
(ii) a pair of rigid upper linkages, each upper linkage joining the central connector means to an upper end of one of the jaws, each rigid upper linkage maintaining an upper end of one of the jaws a fixed distance from an axis of rotation at the lower end of the upper linkage, and allowing pivotal movement of the upper linkages about an upper axis perpendicular to an upper end of one of the jaws, and about the lower axis;

the linkages being so configured that a movement of the central connector means towards the central linkage urges the upper ends of the jaws toward each other and the lower ends of the jaws away from each other.

According to a further aspect of the present invention, there is provided an elevator as described above, or as described in copending U.S. patent application Ser. No. 430,943, comprising in addition, means for locking the jaws open to receive or release a length of pipe, or to allow changing jaw inserts to accommodate a different size of pipe; and for unlocking the jaws to allow closure over and clamping of a length of pipe.

The elevator of this invention provides the important advantage that it operates to clamp and then to release lengths of drill pipe without any threaded connection between the elevator and the drill pipe. In this way, wear on the threads of the drill pipe is eliminated, and rapid clamping and unclamping of drill pipe by the elevator is made possible. The preferred forms of the invention provide the further advantage that they can be automatically locked into a position in which the jaws remain open, and can be automatically unlocked, so that the jaws can close, merely by lowering the upper portion of the elevator with respect to the lower portion of the elevator and the section of drill pipe contained within the lower portion of the elevator, so as to activate a ratchet locking and unlocking mechanism. In this way, the speed with which drill pipe can be removed from a borehole is further increased and the manpower requirements for operating the elevator are reduced to a minimum.

The invention itself, together with further objects and attendant advantages, will best be understood by reference to the following detailed description taken in conjunction with the accompanying drawings.

BRIEF DESCRIPTION OF THE DRAWINGS

FIG. 1 is a perspective view of a presently preferred embodiment of the elevator of this invention.

FIG. 2 is an elevation view taken along line 2—2 of FIG. 1.

FIGS. 6 and 7 are expanded partial sectional views taken along lines 6—6 and 7—7 of FIG. 4.

FIG. 8 is a sectional view taken along line 8—8 of FIG. 7.

FIGS. 9 and 10 are perspective views of the "near side" and "far side" index subassemblies in FIG. 7.

FIG. 11 is a sectional view taken in the plane of FIG. 2, showing the elevator in a locked-open position.

FIG. 12 is a sectional view taken in the plane of FIG. 7, showing the elevator in a locked-open position.

DETAILED DESCRIPTION

Figure 3:
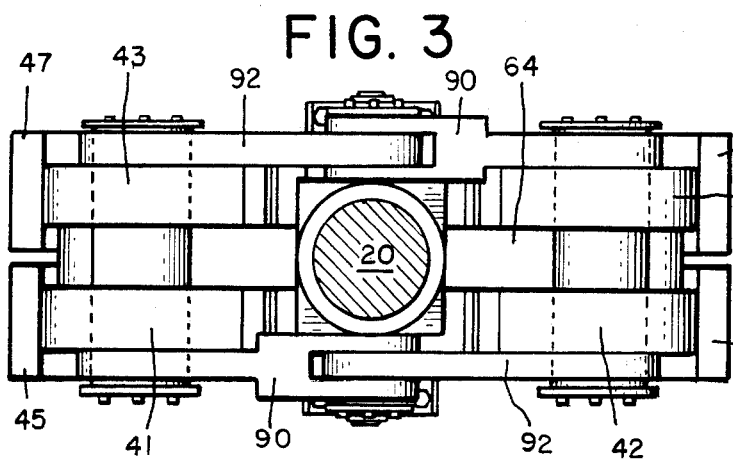
FIGS. 3, 4 and 5 are top, sectional and side views taken along lines 3—3, 4—4 and 5—5 of FIG. 2, respectively.
Figure 5:
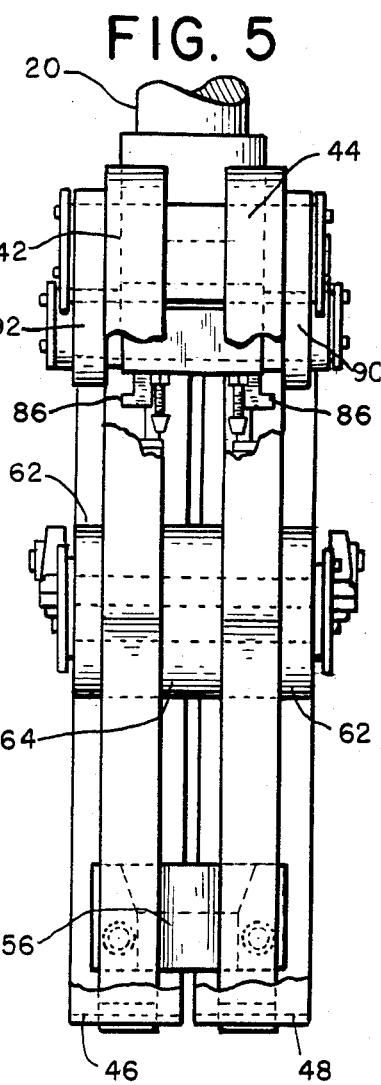
Figure 6:
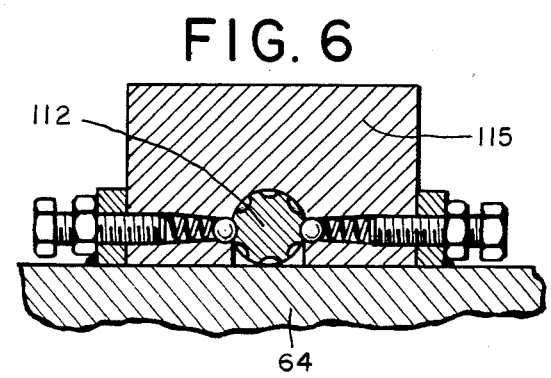
Figure 4:
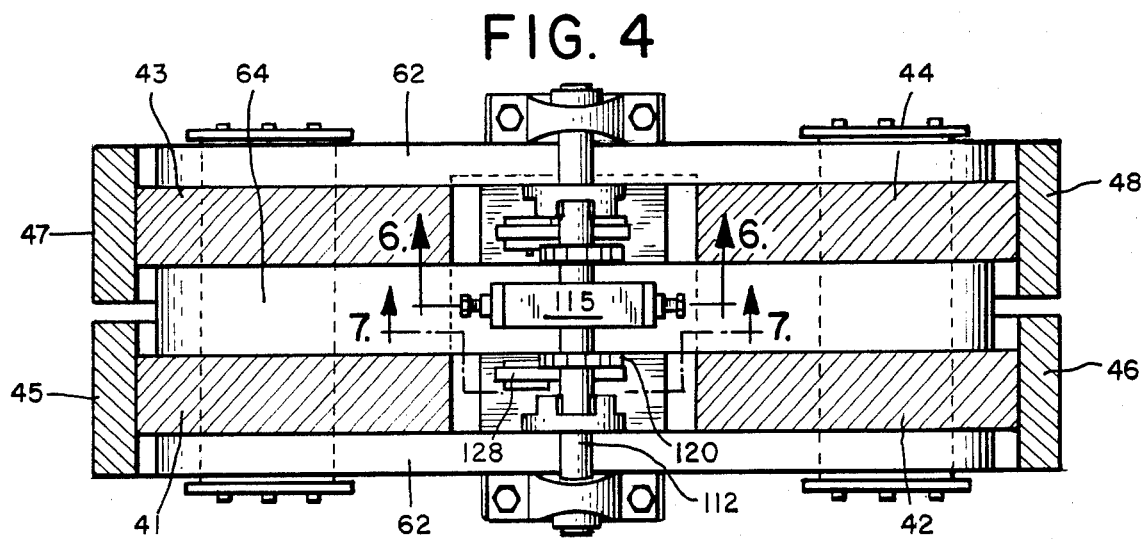
Figure 13:
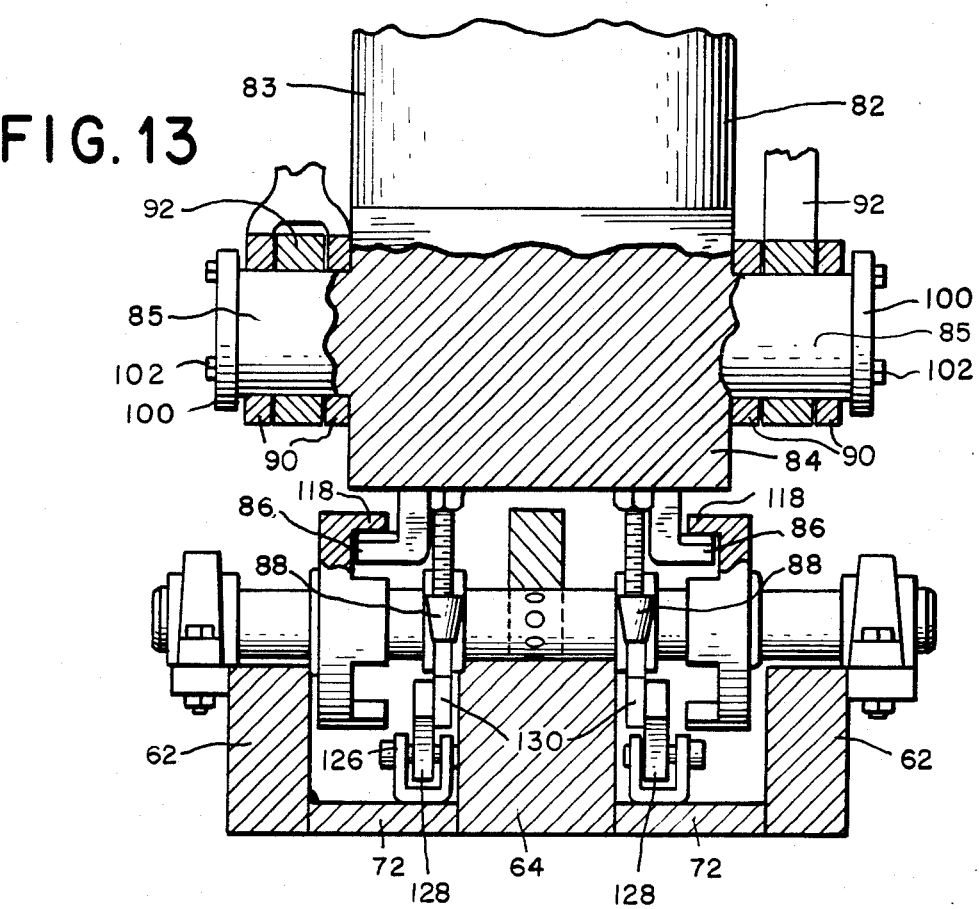
FIG. 13 is a sectional view taken along line 13—13 of FIG. 12.

Turning now to the drawings, FIGS. 1–13 show various views of a first preferred embodiment of the elevator of this invention, FIGS. 11–13 showing in particular the elevator in a locked-open position, so as to maintain the jaws in an open position to receive or release a length of pipe, or to allow changing jaw inserts to accommodate different sizes of pipe.

As shown in the drawing, the elevator 10 is mounted to a swivel saver sub 20, which is in turn suspended from a power swivel. The swivel saver sub 20 is a subassembly suspended from the swivel to save wear and tear on the swivel. When threaded and unthreaded many times, the worn swivel saver sub 20 can be replaced, saving the swivel from all but one threading and unthreading operation. A particular type of swivel used to suspend and rotate the elevator 10 does not form part of this invention and is therefore not shown. A wide range of swivels can be used to support the elevator of this invention, such as for example, that shown in U.S. Pat. No. 4,314,611.

The elevator 10 is configured to clamp the box end 32 of the length of drill pipe 30, and in particular to bear against the shoulder 34 that forms the lower end of the box end 32.

The elevator 10 is made up of at least three, and preferably four, major components: a jaws assembly 40, a central linkage assembly 60, an upper linkage assembly 80, and preferably a jaws locking mechanism 110.

The jaws assembly 40 comprises two jaws, each of which comprises two of the jaw elements 41–44. Each of the jaw elements 41–44 is provided with a jaw element backing 45–48 to provide dimensional stability and weight to the jaws, for rapid closure when the jaws locking mechanism is unlocked. If desired, the jaw elements 41–44 can be provided with indent lips 49–50, to provide clearance between the jaw elements and the connector block 82 of the upper linkage assembly 80.

Each jaw is provided with a clamping surface shaped to support a length of pipe. This is most conveniently provided by means of jaw inserts 54, 56, one jaw insert for each jaw, bridging and connecting the lower portion of two jaw elements. The jaw inserts 54, 56 can be shaped to support one side of a length of drill pipe and a drill pipe shoulder at the end of the drill pipe, and can advantageously be designed so as to be easily changeable (for example, by means of screws) to accommodate different sizes of pipe.

The central linkage assembly 60 preferably comprises a plurality of parallel central linkage elements. In the embodiment shown in the drawings, the central linkage assembly comprises two outer central linkage elements 62, and one inner central linkage element 64, parallel to and between the outer central linkage elements. The jaws and central linkage elements are joined by two central link pins 66, about which the jaw elements 41–44 or central linkage elements 62, 64, or preferably both the jaw elements and the central linkage elements, pivot. In the event both the jaw elements and central linkage elements do not pivot about pins 66, they both pivot about the axis of pins 66.

The central link pins 66 are retained within the jaws and central linkage elements by keeper disks 68, which have an outside diameter larger than the outside diameter of the pin, the keeper disks 68 being attached to central link pins 66 by any convenient means such as screws 70. The keeper disks (both in this location and others, as described below) can be solid disks; or can be provided with central round or other shaped openings, for example to allow access to grease fittings, or to allow a portion of the link pins to protrude through the keeper disks.

The parallel central linkage elements 62 and 64 are joined together with spacer plates 72, to form a platform against which the upper end of a pipe section can be urged.

The upper linkage assembly 80 comprises two upper linkages, each upper linkage comprising a plurality of parallel upper linkage elements, joining the upper end of the jaws to a central connector block (or simply "connector") 82 from which the elevator is suspended. In the embodiment shown in FIGS. 1–13, the connector block 82 has a topmost cylindrical portion 83, a central rectangular solid portion 84, and two sideward projecting cylindrical portions which constitute a pin 85 about which the lower end of each upper linkage pivots. Instead of pin 85 being joined to the central connector, the central connector and the lower end of one of the upper linkages could pivot about the pin joined to the lower end of the other upper linkage; or the lower end of each of the upper linkages and the central connector could all pivot about a common pin.

Figure 14:
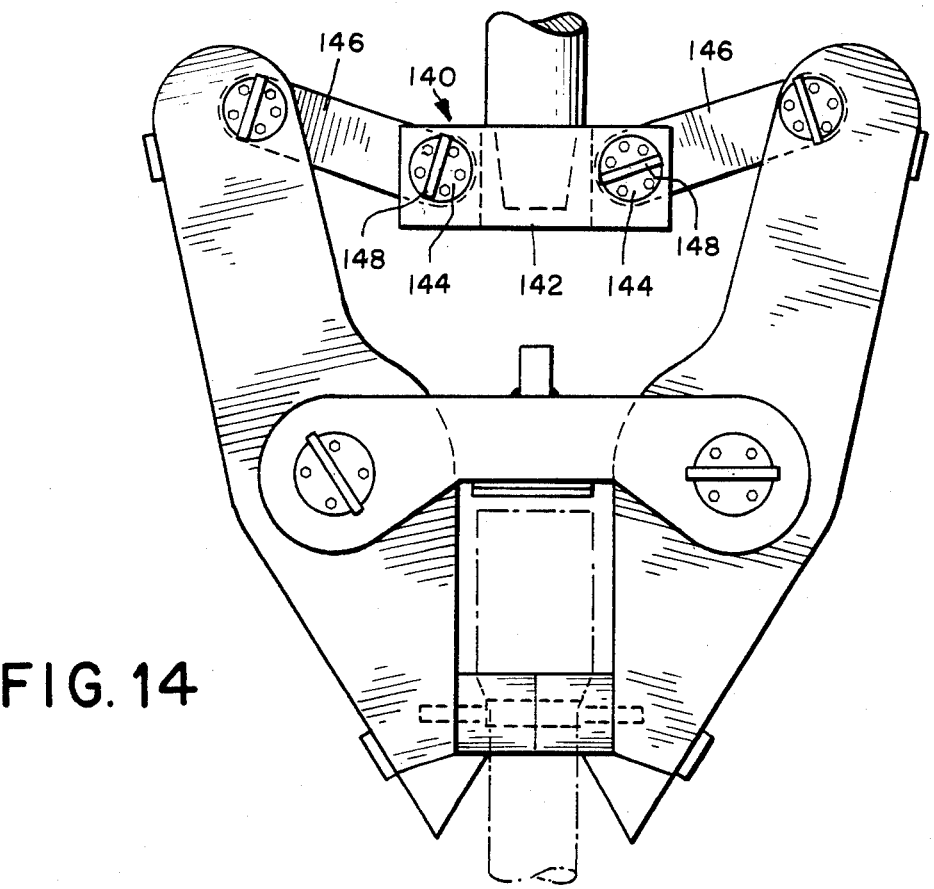
FIG. 14 is an elevation view of an alternate embodiment of the present invention, showing an alternate upper linkage system.

According to an alternate form of the invention illustrated in FIG. 14, the alternate upper linkage assembly 140 could comprise a connector block 142 and two connector block pins 144 for the lower portions of the two upper linkages 146. Also shown in FIG. 14 is an alternate method of securing the pins, namely replacing the keeper discs with pin bars 148.

It is preferred, however, that the pins be secured with keeper discs, as described above with respect to the central linkage assembly.

Returning to the embodiment illustrated in FIGS. 1-13, in the device illustrated, the upper linkage comprises a pair of forked upper linkage elements 90 and straight upper linkage elements 92, the lower end of the straight upper linkage elements fitting within the forked lower portion of the forked upper linkage elements 90. Again, similar to the central linkage assembly, the jaws are joined to the upper linkage elements by two upper link pins 94, about which the upper end of the jaw elements or the upper end of the upper linkage elements, or preferably both, pivot. The upper link pins 94 are, according to the embodiment illustrated in FIGS. 1-13, retained within the jaws and upper linkages by keeper disks 96 having an outside diameter larger than that of the pins 94, the keeper disks being attached to each end of each pin 94 by any appropriate means such as screws 98.

Likewise, the common pin 85 which is an integral portion of the central connector 82 is retained within the lower end of the upper linkages by a pair of connector block keeper discs 100 having an outside diameter larger than that of the pin 85, the keeper discs being attached to each end of the pin 85 by any appropriate means such as screws 102.

According to a highly preferred embodiment of the invention, the elevator comprises a jaws locking mechanism 110 which constitutes means for locking the jaws open to receive or release a length of pipe, or to allow changing the jaw inserts 54, 56 to accommodate a different size of pipe; and for unlocking the jaws to allow closure over and clamping of a length of pipe. Preferably, the locking means is so configured to be responsive to an urging together of the platform which comprises the central linkage elements and the central connector, to lock the jaws open, if unlocked; and responsive to an urging together of the platform which comprises the central linkage elements and the central connector, to unlock the jaws, if locked open.

According to the embodiment shown in FIGS. 1-13, the means for locking the jaws open and for unlocking the jaws comprises:

(a) at least one latch lug hook, preferably two latch lug hooks 86, depending from the central connector 82, for holding the central connector in a position near the central linkage when the hook is engaged;

(b) at least one latch lug wheel 116 (i.e., one for each latch lug hook) mounted upon a latch shaft 112, each of the latch lug wheels 116 being provided with at least one latch lug 118 for engaging the latch lug hook 86 which depends from the central connector; and (c) ratchet means for rotating the shaft and latch lug wheels, responsive to an urging together of the platform which comprises the central linkage elements, and the central connector.

Accordingly to the embodiment illustrated, a latch shaft 112 is rotatably mounted on inner central linkage element 64 by means of pillow block bearings 114. A centrally located straddle bar 115 acts as a vertical overtravel stop and contains rotation stop detents (see FIG. 6) to ensure exact rotation step positions for latch shaft 112 in the short vertical (neutral) stroke before the latch lugs 118 engage the latch lug hooks 86. The straddle bar 115 acts primarily as a bending restraint. The weight of shaft 112 and the parts suspended from the shaft 112 are supported by pillow block bearings 114. Two ratchet wheels 120 of the ratchet means and two latch lug wheels 116 are each keyed to the latch shaft 112 by key 122, so that the ratchet wheels, latch lug wheels and latch shaft all rotate in concert. The amount of rotation for each urging together of the platform and the central connector is $\frac{1}{2}n$ of a revolution, where n is the number of latch lugs on the latch lug wheel, preferably four. In other words, in the preferred embodiment illustrated, there are four latch lugs for engaging each of the two depending hooks. Each action of the ratchet means rotates the ratchet wheels, and therefore the latch shaft and the latch lug wheels, $\frac{1}{8}$ of a revolution, thereby engaging the latch lugs with the latch lug hooks if they are not engaged, but disengaging the latch lugs from the latch lug hooks if they are engaged.

The ratchet means further also preferably comprises a pair of index projections, or studs 87, on the lower end of the central connector, so configured to activate the ratchet means. The ratchet means preferably comprises an index subassembly means 124, which in turn comprises two index pivot blocks 126, one mounted on each of the spacer plates 72 which join the outer central linkage elements 62 to the inner central linkage element 64; two index pivot bars 128, one pivotably mounted on each index pivot block 126, for urging an index dog 130 upward responsive to downward urging by the index projections 87 which depend from connector block 82; a pair of index dogs 130, one pivotably mounted on each index pivot bar 128, for urging the ratchet wheels and thereby the latch shaft 112, the latch lug wheel 116 and latch lugs 118 about the axis of latch shaft 112; and a pair of index stops 88, which depend from connector block 82, and engage the back surface of the approaching ratchets to prevent momentum overtravel beyond $\frac{1}{2}n$ revolution.

The index projections 87 preferably include means such as index bolts, mounted at the end of the index projections, for adjusting the length of the index projections to insure proper operation of the ratchet mechanism.

The index dogs 130 are preferably attached to the index pivot bars 128, and the index pivot bars 128 attached to the index pivot blocks 126, by means of shoulder screws 132, for ease of adjustment. The other attachments are preferably by means of standard hex-head capscrews, each provided with a lock washer (not shown). Furthermore, the pins 66, 85, and 94 are preferably provided with one or two grease fittings per pin, likewise not shown.

The operation of the device is described as follows. Starting from a locked-open position, the pipe elevator is lowered over a vertical section of pipe 30, the flat upper end of which touches the platform formed of the central linkage elements 62,64 and the spacer plates 72 between the central linkage elements, urging the connector block 82 and central linkage elements 62, 64 together. Index projections 87 activate index pivot bars 128, urging index dogs 130 into ratchet wheel 120, and causing ⅛ of a revolution of latch shaft 112. Latch lug wheel 116 containing four latch lugs 118 is likewise rotated ⅛ of a revolution, thereby disengaging latch lugs 118 from depending hooks 86. The jaws are then allowed to fall around the upper end of the length of drill pipe 30, grasping the box end 32 of the drill pipe 30. Raising the swivel saver sub 20 causes the jaws to grasp the pipe firmly, which can then be pulled upwards the requisite amount.

When the next joint becomes accessible, slips are engaged around the second topmost length of drill pipe to hold the string of pipe, and the topmost length of pipe is disengaged using either a wrench or tongs. The power swivel and elevator are used to finish unscrewing the thread at the lower end of the pipe in the elevator. A boom is brought in and clamped to the now disconnected topmost section of drill pipe. The power swivel is lowered against the top end of the drill pipe, again opening the jaws and activating the ratchet to lock the jaws in an open position. The elevator can then be raised to remove the elevator from the pipe, the disconnected drill pipe section can be removed for storage, and the process repeated with a new section of pipe. When the drill bit has been replaced, or whatever other action which required removal of the drill pipe has been accomplished, the entire process can be repeated in reverse to lower the drill pipe into the hole, section by section.

Of course, it should be understood that a wide range of changes and modifications to the preferred embodiments described above can be made without departing from the scope of this invention. It is therefore intended that the foregoing detailed description be regarded as illustrative rather than limiting, and that it be understood that it is the following claims, including all equivalents, which are intended to define the scope of this invention.

I claim:

1. An elevator for drill pipe, comprising:
   (a) at least two jaws, each jaw having a clamping surface shaped to support a length of pipe;
   (b) a central linkage assembly, serving as a pivot means for urging the clamping surfaces of the jaws into contact with a length of pipe to be elevated, when the ends of the jaws distant from the clamping surfaces are urged away from the pipe; and
   (c) an upper linkage assembly, serving as an elevator suspension and jaw activating means for suspending the elevator, for urging the ends of the jaws distant from the clamping surfaces away from the pipe, and in conjunction with the pivot means, for urging the clamping surfaces into contact with the pipe, when the elevator suspension and jaw activating means and a pipe are urged away from each other; and as a release means for urging the clamping surfaces away from the pipe when the elevator suspension and jaw activating means and the pipe are urged toward each other.

2. An elevator for drill pipe, comprising:
   (a) a pair of opposed jaws for clamping a section of drill pipe, each jaw having at its lower end, a clamping surface shaped to support a length of pipe;
   (b) central linkage means for holding the jaws apart while pivoting about axes at the ends of the central linkage means; and
   (c) upper linkage and suspension means, for supporting the elevator, for urging the upper portion of the jaws outward to grasp a section of drill pipe with the clamping surfaces, and for urging the upper portion of the jaws inward to release the section of drill pipe.

3. An elevator for drill pipe, comprising:
   (a) a pair of opposed jaws for clamping a section of drill pipe, each jaw having a clamping surface shaped to support one side of a length of drill pipe and a drill pipe shoulder at the end of the drill pipe;
   (b) a rigid central linkage joining a central portion of each jaw to a central portion of the opposing jaw, maintaining the central portions of each jaw a fixed distance apart, and allowing pivotal movement of each jaw about an axis perpendicular to the jaw; and
   (c) a jointed upper linkage assembly, comprising:
      (i) central connector means, and
      (ii) a pair of rigid upper linkages, each upper linkage joining the central connector means to an upper end of one of the jaws, each rigid upper linkage maintaining an upper end of one of the jaws a fixed distance from an axis of rotation at the lower end of the upper linkage, and allowing pivotal movement of the upper linkages about an upper axis perpendicular to an upper end of one of the jaws, and about the lower axis;
   the linkages being so configured that a movement of the central connector means toward the central linkages urges the upper ends of the jaws toward each other and the lower ends of the jaws away from each other.

4. An elevator according to one of claims 1, 2 or 3, comprising:
   (a) two jaws, each jaw comprising a plurality of parallel jaw elements;
   (b) a central linkage comprising a plurality of parallel central linkage elements; and
   (c) an upper linkage assembly comprising two upper linkages, each upper linkage comprising a plurality of parallel upper linkage elements, joining the upper end of the jaws to a central connector from which the elevator is suspended.

5. An elevator according to claim 4, wherein the jaws and central linkage elements are joined by 2 pins about which the jaw elements or central linkage elements, or both, pivot.

6. An elevator according to claim 5, wherein the pins are retained within the jaws and central linkage by keeper disks having an outside diameter larger than that of the pins, the keeper disks being attached to each end of each pin.

7. An elevator according to claim 6, wherein the keeper disks are attached by screws.

8. An elevator according to claim 4, wherein the parallel central linkage elements are joined with spacer plates to form a platform against which the upper end of a pipe section can be urged.

9. An elevator according to claim 4, wherein the jaws and upper linkage elements are joined by 2 pins about which the upper end of the jaw elements or the upper end of the upper linkage elements, or both, pivot.

10. An elevator according to claim 9, wherein the pins are retained within the jaws and upper linkages by keeper disks having an outside diameter larger than that of the pins, the keeper disks being attached to each end of each pin.

11. An elevator according to claim 10, wherein the keeper disks are attached by screws.

12. An elevator according to claim 4, wherein the upper linkages are joined to the central connector by 2 pins about which the lower end of each upper linkage or the central connector, or both, pivot.

13. An elevator according to claim 4, wherein the upper linkages are joined to the central connector by 1 pin about which at least two of the lower end of each upper linkage and the central connector pivot.

14. An elevator according to claim 13, wherein the lower end of each upper linkage pivots about a common pin which is integral with the central connector.

15. An elevator according to claim 14, wherein the pin is retained within the linkages by keeper disks having an outside diameter larger than that of the pins, the keeper disks being attached to each end of the pin.

16. An elevator according to claim 15, wherein the keeper disks are attached by screws.

17. An elevator for drill pipe, comprising:
(a) at least two jaws, each jaw having a clamping surface shaped to support a length of pipe;
(b) pivot means for urging the clamping surfaces of the jaws into contact with a length of pipe to be elevated, when the ends of the jaws distant from the clamping surfaces are urged away from the pipe;
(c) elevator suspension and jaw activating means for suspending the elevator, for urging the ends of the jaws distant from the clamping surfaces away from the pipe, and in conjunction with the pivot means, for urging the clamping surfaces into contact with the pipe, when the elevator suspension and jaw activating means and the pipe are urged away from each other;
(d) release means for urging the clamping surfaces away from the pipe when the elevator suspension and jaw activating means and the pipe are urged toward each other; and
(e) means for locking the jaws open to receive or release a length of pipe, and for unlocking the jaws to allow closure over and clamping of a length of pipe.

18. An elevator according to one of claims 1, 2, 3 or 17, wherein the clamping surfaces of the jaws are changeable to accommodate different sizes of pipe.

19. An elevator according to one of claims 1, 2 or 3, comprising in addition, means for locking the jaws open to receive or release a length of pipe, and for unlocking the jaws to allow closure over and clamping of a length of pipe.

20. An elevator according to claim 19, wherein the means for locking the jaws open to receive or release a length of pipe, and for unlocking the jaws to allow closure over and clamping of a length of pipe is responsive to an urging together of the platform which comprises the central linkage elements and the central connector, to lock the jaws open, if unlocked; and responsive to an urging together of the platform which comprises the central linkage elements and the central connector, to unlock the jaws, if locked open.

21. An elevator according to claim 20, wherein the means for locking the jaws open to receive or release a length of pipe, and for unlocking the jaws to allow closure of and clamping of a length of pipe comprises:
(a) at least one hook depending from the central connector for holding the central connector in a position near the central linkage when the hook is engaged;
(b) at least one latch lug wheel mounted upon a shaft, having at least one latch lug thereon for engaging the hook; and
(c) ratchet means for rotating the shaft and latch lug wheel $\frac{1}{2}n$ of a revolution, where n is the number of latch lugs on the latch lug wheel, responsive to an urging together of the platform which comprises the central linkage elements and the central connector.

22. An elevator according to claim 21, wherein the ratchet wheels of the ratchet means and the latch lug wheels are keyed to the shaft to rotate in concert.

23. An elevator according to claim 21, wherein n=4.

24. An elevator according to claim 21, wherein two hooks depend from the central connector for holding the central connector in a position near the central linkage when the hooks are engaged, and two latch lug wheels are mounted upon the shaft, wherein the ratchet means comprises an index subassembly means, which in turn comprises:
(a) a pair of index projections on the lower end of the central connector;
(b) an index pivot bar for each index projection, for urging an index dog upward responsive to downward urging by the index projection;
(c) an index dog, pivotably mounted on each index pivot bar, for urging the ratchet wheel about the shaft; and
(d) an index stop, mounted on the lower end of the central connector, which prevents shaft assembly rotation beyond $\frac{1}{2}n$ revolution to ensure repeatable and positive stepping per cycle.

* * * * *